United States Patent [19]

Russell

[11] 4,373,007
[45] * Feb. 8, 1983

[54] [NON-PHOTOINITIALIO] NON-PHOTOCATALYZED DIPENTAERYTHRITOL POLYACRYLATE BASED COATING COMPOSITIONS EXHIBITING HIGH ABRASION RESISTANCE

[75] Inventor: Raymond J. Russell, Lincoln Park, N.J.

[73] Assignee: Panelgraphic Corporation, West Caldwell, N.J.

[*] Notice: The portion of the term of this patent subsequent to Dec. 29, 1998, has been disclaimed.

[21] Appl. No.: 203,276

[22] Filed: Nov. 3, 1980

[51] Int. Cl.$^3$ .............. B32B 27/38; B05D 3/02; C08F 2/50
[52] U.S. Cl. .............. 428/412; 204/159.12; 427/44; 427/54.1; 427/421; 427/428; 428/483; 428/515; 428/520; 430/286
[58] Field of Search .............. 252/600; 260/31.2 XA, 260/31.6, 31.2, 17 R; 427/44, 421, 428, 54.1; 430/286; 428/412, 483, 515, 520; 204/159.12

[56] References Cited

U.S. PATENT DOCUMENTS

| | | |
|---|---|---|
| 1,552,795 | 9/1925 | Clarke . |
| 1,935,577 | 11/1933 | Reid .............. 260/2 |
| 2,052,658 | 9/1936 | Reid .............. 134/26 |
| 2,288,352 | 6/1942 | Henderson .............. 95/73 |
| 2,329,456 | 9/1943 | Campbell .............. 260/42 |
| 2,505,067 | 4/1950 | Sacks et al. .............. 204/162 |
| 2,512,726 | 6/1950 | Penn et al. .............. 260/19 |
| 2,927,022 | 3/1960 | Martin et al. .............. 96/35 |
| 2,993,789 | 7/1961 | Crawford .............. 96/35 |
| 3,024,216 | 3/1962 | Smitmans et al. .............. 260/45.5 |
| 3,046,127 | 7/1962 | Barney et al. .............. 96/35 |
| 3,047,422 | 7/1962 | Sites et al. .............. 117/93 |
| 3,076,723 | 2/1963 | Covington .............. 117/93.31 |
| 3,149,975 | 9/1964 | Notley .............. 96/115 |
| 3,164,539 | 1/1965 | Smith .............. 204/158 |
| 3,203,802 | 8/1965 | Burg .............. 96/87 |
| 3,278,304 | 10/1966 | Conix et al. .............. 96/35.1 |
| 3,359,193 | 12/1967 | Pinner .............. 204/159.17 |
| 3,380,831 | 4/1968 | Cohen et al. .............. 96/115 |
| 3,542,661 | 11/1970 | Klopfer et al. .............. 204/159.17 |
| 3,551,235 | 12/1970 | Bassemir et al. .............. 156/99 |
| 3,551,246 | 12/1970 | Bassemir et al. .............. 156/272 |
| 3,551,311 | 12/1970 | Bassemir et al. .............. 204/159.18 |
| 3,556,791 | 1/1971 | Suzuki et al. .............. 96/35.1 |
| 3,557,049 | 1/1971 | Muskat .............. 260/41 |
| 3,567,494 | 3/1971 | Fitko .............. 117/93.31 |
| 3,645,984 | 2/1972 | Dowbenko .............. 260/78.4 |
| 3,661,614 | 5/1972 | Bassemir et al. .............. 204/159.23 |
| 3,726,709 | 4/1973 | Garratt et al. .............. 117/93.31 |
| 3,826,014 | 7/1974 | Helding .............. 34/1 |
| 3,874,906 | 4/1975 | Prucnal .............. 117/93.31 |
| 3,903,322 | 9/1975 | Ravve et al. .............. 204/159.23 |
| 3,914,594 | 10/1975 | Helding .............. 240/41.35 |
| 3,968,305 | 7/1976 | Oshima et al. .............. 428/334 |
| 3,968,309 | 7/1976 | Matsuo et al. .............. 428/409 |
| 3,974,303 | 8/1976 | Iwase et al. .............. 427/27 |
| 3,978,178 | 8/1976 | Oshima et al. .............. 264/25 |
| 3,988,228 | 10/1976 | Newland et al. .............. 204/159.23 |
| 3,992,276 | 11/1976 | Powanda et al. .............. 204/159.16 |
| 3,996,394 | 12/1976 | Harris .............. 427/54 |
| 3,998,712 | 12/1976 | Hickmann et al. .............. 204/159.15 |
| 4,005,244 | 1/1977 | Wismer et al. .............. 428/480 |
| 4,012,302 | 3/1977 | Wang et al. .............. 204/159.12 |
| 4,016,334 | 4/1977 | Collins et al. .............. 428/463 |
| 4,024,297 | 5/1977 | Gruber .............. 427/54 |
| 4,042,749 | 8/1977 | Sandvig .............. 428/412 |
| 4,045,416 | 8/1977 | Robson et al. .............. 260/77.5 |
| 4,065,368 | 12/1977 | Holtzman .............. 204/159.23 |
| 4,066,582 | 1/1978 | Babian et al. .............. 260/17 A |
| 4,067,791 | 1/1978 | Konno et al. .............. 204/159.15 |
| 4,070,499 | 1/1978 | Ramler et al. .............. 427/54 |
| 4,073,967 | 2/1978 | Sandvig .............. 427/44 |
| 4,084,021 | 4/1978 | Sandvig .............. 427/44 |
| 4,086,373 | 4/1978 | Tobias et al. .............. 427/44 |
| 4,091,050 | 5/1978 | McDonald .............. 260/837 |
| 4,097,350 | 6/1978 | Pastor et al. .............. 204/159.23 |
| 4,099,837 | 7/1978 | Vazirani .............. 350/96.29 |
| 4,113,893 | 9/1978 | Hahn .............. 427/44 |
| 4,116,788 | 9/1978 | Schmitt et al. .............. 204/159.23 |
| 4,134,809 | 1/1979 | Pacifici et al. .............. 204/159.12 |
| 4,147,603 | 4/1979 | Pacifici et al. .............. 204/159.12 |
| 4,194,955 | 3/1980 | Nowak .............. 427/44 |
| 4,194,955 | 3/1980 | Nowak et al. .............. 204/159.15 |
| 4,199,421 | 4/1980 | Kamada et al. .............. 204/159.22 |
| 4,234,676 | 11/1980 | Hein .............. 427/44 |
| 4,273,633 | 6/1981 | Carder et al. .............. 204/159.17 |
| 4,273,799 | 6/1981 | Kamada et al. .............. 427/44 |
| 4,273,802 | 6/1981 | Kamada et al. .............. 427/54.1 |
| 4,274,933 | 6/1981 | Kamada et al. .............. 204/159.24 |
| 4,287,227 | 9/1981 | Kanada et al. .............. 427/44 |
| 4,291,097 | 9/1981 | Kanada et al. .............. 427/44 |
| 4,308,119 | 12/1981 | Russell .............. 204/159.12 |

FOREIGN PATENT DOCUMENTS 1347679 2/1974 United Kingdom .
1347680 2/1974 United Kingdom .

OTHER PUBLICATIONS

Chem. Abstract, vol. 90, 24897q, (1979), (C.A. '897).
Chem. Abstract, vol. 89, 148289j, (1978), (C.A. '289).
Chem. Abstract, vol. 89, 216936v, (1978), (C.A. '936).
Chem. Abstract, vol. 85, 6864m, (C.A. '864).
Chem. Abstract, vol. 84, 32769h, (1976), (C.A. '769).
Chem. Abstract, vol. 84, 32764c, (1976), (C.A. '764).
Chem. Abstract, vol. 88, 138049w, (1978), (C.A. '049).
Chem. Abstract, vol. 88, 8657g, (1978), (C.A. '657).
Article, Polymers, Paint & Colour Journal, (9-78), pp. 781, 782, 784 & 786, "Use of Cellulose Acetate Butyrate Esters as Coating Additives".

Primary Examiner—Norman Morgenstern
Assistant Examiner—Janyce A. Bell
Attorney, Agent, or Firm—Ronald G. Goebel

[57] ABSTRACT

Actinic radiation curable coating compositions are provided requiring no photoinitiator or photocatalyst which are applicable to many substrates comprising a dipentaerythritol-based polyacrylate such as dipentaerythritol pentaacrylate, a cellulose ester such as cellulose acetate butyrate or a vinyl chloride-vinyl acetate containing copolymer. The compounds are preferably applied to the substrate by spraying a solution of the composition in one or more solvents selected from the group consisting of lower alcohols and esters, ketones having from 3 to 7 carbon atoms and lower alkyl Cellosolves, and removing the solvents. Roller gravure coatings may also be employed.

Upon curing in air the compositions form extremely high abrasion resistant coatings on the substrate and are also characterized by being scratch resistant and resistant to attack by chemical and organic solvents and are stress crack resistant.

33 Claims, No Drawings

[NON-PHOTOINITIALIO] NON-PHOTOCATALYZED DIPENTAERYTHRITOL POLYACRYLATE BASED COATING COMPOSITIONS EXHIBITING HIGH ABRASION RESISTANCE

BACKGROUND OF THE INVENTION

This invention relates to radiation curable coating compositions which when cured form highly abrasion resistant coatings for most any substrate.

In the past, many curable or crosslinkable compositions have been developed in the art for use as coatings for clear plastics and the like which when cured offer varying degrees of abrasion and solvent resistance. Among such compositions are fluorocarbon-vinyl ether copolymers crosslinked with polysilicic acid, melamine-formaldehyde coatings, polyurethanes, polysiloxanes, polyakyls, polyallyldicarbonates, and polyfunctional acrylics. Such coatings have been applied to a wide variety of polymeric substrates including acrylic sheeting, polycarbonates, polyesters and the like. These compositions are generally applied to the substrate by any known method such as dipping, brushing or spraying and are cured at either high temperature or at low temperature in the presence of a catalyst. Ultraviolet curable coatings based on unsaturated polyester resins, including polyacrylics, and containing a photoinitiator have also been described in the art.

The present invention deals with dipentaerythritol polyacrylate-based compositions which can be applied as thin coatings to a variety of substrates and cured by actinic radiation in the absence of a photoinitiator or photocatalyst. Precured coatings of these compositions are dust-free, level out well on the substrates and are stable against air inhibition of cure such that they can be cured in air hours after application to the substrate. On curing, coatings are formed exhibiting high abrasion resistance and stress crack resistance. Such coatings are additionally scratch resistant and are not attacked by chemical or organic solvents.

SUMMARY OF THE INVENTION

The curable compositions of this invention comprise a dipentaerythritol based polyacrylate, particularly dipentaerythritol pentaacrylate and a cellulose ester of a vinyl chloride-vinyl acetate containing polymer. It has been found that such compositions can be cured by actinic radiation without the necessity of a photoinitiator. The compositions can be applied to the substrate by any means known in the art such as by brushing, dipping, spraying or by roller, gravure, spin or flow coating techniques. Solvents such as lower alcohols, lower acetates, ketones and ethylenegylcol alkyl ethers may also be added to the composition to facilitate mixing of the components and to allow efficient and uniform application of the composition to the substrate.

In another embodiment of this invention a method of forming an abrasion resistant coating on a substrate is provided comprising applying the above composition to the substrate to form a coating, removing any solvents from the composition by evaporation and exposing the coating to ultraviolet radiation to effect curing thereof. The present compositions allow for the coating of thin-cured films in the substrate in the order of 3 microns or less which films are stress crack resistant in addition to being abrasion and scratch resistant. The compositions are particularly suited for coating substrates which undergo bending such as photographic film. In addition, compositions according to the present invention can be prepared having a high solids content which makes them well suited for gravure coating applications.

DETAILED DESCRIPTION OF THE PREFERRED EMBODIMENTS

The dipentaerythritol-based polyacrylates of this invention include dipentaerythritol pentaacrylate, dipentaerythritol hexaacrylate and mixtures thereof. Such polyacrylates are prepared by esterifying dipentaerythritol with acrylic acid as well known in the art. In the case of dipentaerythritol pentaacrylate there is a free unesterified hydroxyl group and hence this compound can also be designated as dipentaerythritol hydroxy pentaacrylate. Dipentaerythritol hexaacrylate contains no unesterified hydroxyl groups.

The cellulose esters of this invention comprise the reaction product of cellulose with at least one organic carboxylic acid having from about 2 to 4 carbon atoms or nitric acid. The preferred cellulose esters are cellulose acetate butyrates containing on the average from about 15% to 50% butyrl groups, from about 1% to 30% acetyl groups and from about 1% to 5% hydroxyl groups and preferably having a viscosity in Poises of from about 50 to 200 at 25° C. in a solution comprising 20 wt. % cellulose ester, 72 wt. % acetone and 8 wt. % ethyl alcohol. Particularly preferred is a cellulose acetate butyrate containing on the average 37% butyryl groups, 13% acetyl groups and 2% hydroxyl groups and having a viscosity in Poises of from about 64 to 124 at 25° C. in the above described solution. Nitrocellulose may also be employed as the cellulose ester.

The preferred vinyl chloride-vinyl acetate containing polymers useful in this invention is a partially hydrolyzed vinyl chloride-vinyl acetate copolymer formed by the hydrolysis of a copolymer of vinyl chloride and vinyl acetate so that part of the acetate groups on the copolymer chain are replaced by hydroxyl groups to form vinyl alcohol. The preparation of such partially hydrolyzed vinyl copolymers is described in U.S. Pat. No. 2,512,726. For use in this invention the partially hydrolyzed vinyl copolymer should contain from about 50% to 95% combined vinyl chloride monomer, from about 2% to about 35% combined vinyl acetate monomer and from about 3% to about 15% combined vinyl alcohol monomer. Particularly preferred is a partially hydrolyzed vinyl chloride-vinyl acetate copolymer containing 91% combined vinyl chloride, 3% combined vinyl acetate and 6% combined vinyl alcohol.

Other vinyl chloride-vinyl acetate containing polymers useful in this invention include vinyl chloride-vinyl acetate copolymers modified with alpha-beta unsaturated olefinic carboxylic acids or epoxy compounds. The carboxylic acid modified vinyl copolymers are prepared by copolymerizing vinyl chloride monomer and vinyl acetate monomer in the presence of small quantities, e.g., up to 10% by weight, of the alpha, beta unsaturated acid or acid derivative in the presence of a catalyst. Exemplary of such acid or acid derivatives are maleic acid, maleic anbydride, monoesters of maleic acid, acrylic acid or methacrylic acid. Such modified vinyl copolymers are described in U.S. Pat. No. 2,329,456.

A vinyl chloride-vinyl acetate copolymer, unmodified and unhydrolyzed, may also be employed in this invention provided it is compatible with other components used in the coating composition such as solvents and additives.

The compositions of the present invention may be applied to the substrate in any conventional manner such as spraying, dipping, brushing or by roller, gravure, spin or flow coating techniques. Spraying is preferred since it allows uniform application of thin cured coatings to the substrate, i.e. on the order of 3 microns or less.

In order to facilitate mixing of the elements of the composition and to allow for efficient spraying, one or more solvents may be employed in the composition, which include lower alcohols having from 1 to 4 carbon atoms such as propanol and butanol; lower alkyl acetates having from 4 to 6 carbon atoms such as propyl and butyl acetate; alkyl ketones having from 3 to 7 carbon atoms such as methyl isoamyl ketone; and ethylene glycol lower alkyl ethers (Cellosolves) such as methyl and ethyl Cellosolve. Organic solvents other than those named above may also be employed provided they are good solvents for the dipentaerythritol-based polyacrylate and cellulose ester or vinyl chloride-vinyl acetate containing polymer and do not attack the substrate on which the composition is coated.

The composition may also contain small amounts of flatting agents to lower the gloss of the coating and silicones to increase the flowability of the compositions.

The substrates which can be coated with the curable compositions of this invention are numerous and include any material to which the composition will adhere and coat such as wood, pretreated glass, metal, rubber and polymeric substrates such as polycarbonates, polyvinyls including rigid polyvinyl chloride sheet substrate and substrates comprised of copolymers of polyvinyl chloride and polyvinylacetate, polyacrylics and polyesters. The compositions may be used for the coating of vinyl and polycarbonate substrates used to manufacture low reflection filters for cathode ray tubes (C.R.T's) and for acrylic substrates used as front panels for electronic equipment.

Upon curing in air by actinic radiation, without a photoinitiator, the present compositions form highly abrasion resistant and scratch resistant coatings. The cured compositions of this invention are also characterized by their resistance to organic solvents, acids and bases. The cured coatings are also stress crack resistant and can therefore act as coatings for flexible or bendable substrates such as photographic film.

The curable compositions of this invention are prepared by first forming a heavy solution of the cellulose ester or vinyl chloride-vinyl acetate copolymer in one or more solvents, i.e. about 10 to 15% by weight. A portion of this solution and the dipentaerythritol-based polyacrylate is added to a further solvent system to provide a coating composition which can be applied to the substrate by spraying. For example such a coating composition can be formed using pentaerythritol tetraacrylate and cellulose acetate butyrate by adding a portion of a heavy solution of cellulose acetate butyrate in propyl acetate and propanol and dipentaerythritol pentaacrylate to a further solvent system including butyl alcohol, butyl acetate, methyl isoamyl ketone, methyl cellosolve and additional propyl acetate and propanol to form a solution containing the following weight percentages of each component:

| | |
|---|---|
| dipentaerythritol pentaacrylate | 27.2 wt. % |
| cellulose acetate butyrate | 2.7 wt. % |
| propyl acetate | 10.5 wt. % |
| propyl alcohol | 5.0 wt. % |
| methyl cellosolve | 22.7 wt. % |
| methyl isoamyl ketone | 7.5 wt. % |
| butyl acetate | 12.2 st. % |
| butyl alcohol | 12.2 wt. % |
| | 100 wt. % |

This composition provides a weight ratio of dipentaerythritol pentaacrylate to cellulose acetate butyrate of about 10 to 1. In the case of a vinyl chloride-vinyl acetate containing polymer a similar coating composition can be prepared wherein the ratio of pentaacrylate to polymer is about 8 to 2.

A photoinitiator is not added to the sprayable composition. It has been found that the dipentaerythritol polyacrylate-based coating compositions of this invention can be cured by actinic radiation in the absence of any photoinitiator.

The weight ratio of dipentaerythritol-based polyacrylate to copolymer or cellulose ester is an important factor in determining the abrasion-resistance of the final cured coating. The presence of the cellulose ester or copolymer also solves some critical problems associated with air curing of the polyacrylate and in avoiding tacky, dust-adhering films prior to curing. For example, curing a thin film of dipentaerythritol pentaacrylate alone in an air atmosphere does not result in an appreciably abrasion-resistant, dry film. The tackiness or wetness of the film during curing picks up dirt and dust due to the air's inhibition of the acrylate cure. Moreover, the thinner the film, the less the abrasion-resistance. If, on the other hand, a thin film of dipentaerythritol pentaacrylate is cured in the absence of air a dry, abrasion-resistant film is formed without dirt or dust pickup. For most all curing operations excluding air is highly impractical and costly. By virtue of the use of a partially hydrolyzed vinyl chloride-vinyl acetate copolymer or cellulose ester with dipentaerythritol pentaacrylate in coating films, there is produced a semi-dry film on the substrate after solvent removal which does not pick up dirt or dust after solvent removal. It is additionally of sufficient stability to be cured hours later in an air atmosphere thus eliminating the need for precuring under an inert gas such as nitrogen. Moreover, thin films of 3 microns or less can be produced without loss of abrasion-resistance or dryness and are stress crack resistant as well. As the amount of copolymer or cellulose ester is reduced below certain limits, the abrasion resistance and dryness of the film is reduced. Coatings containing too low a ratio of dipentaerythritol-based polyacrylate to copolymer or cellulose ester tend to lose abrasion-resistance in the cured state because of the lack of sufficient amounts of cross-linked polyacrylate. Coatings containing too high a ratio tend to lose abrasion-resistance in the cured state because of the non-uniform or irregular distribution of the polyacrylate. Coatings cured in an air atmosphere containing no copolymer or cellulose ester for example, are not abrasion-resistant. Therefore there exists a set of ratio ranges for each type of polyacrylate and cellulose ester or copolymer below which abrasion-resistance in the finally cured coatings may decrease significantly or completely.

In the case of compositions containing dipentaerythritol pentaacrylate and a partially hydrolyzed vinyl chloride-vinyl acetate copolymer containing 91% combined vinyl chloride, 3% combined vinyl acetate and 6% combined vinyl alcohol or cellulose acetate butyrate this ratio should be between about 5 to 1 and about 100 to 1 to achieve abrasion-resistance in the cured coatings. High abrasion-resistance is achieved, in the case of the pentaacrylate and cellulose acetate butyrate at ratios of from about 8 to 1 to about 20 to 1 with optimum abrasion-resistance being achieved at a ratio of about 10 to 1. In the case of the pentaacrylate and partially hydrolyzed copolymer, high abrasion-resistance is achieved at ratios of from about 6 to 1 and 15 to 1 with optimum abrasion-resistance being achieved at a ratio of about 8 to 1. Below or above these ranges, the abrasion-resistance of the cured coatings decreases significantly.

The sprayable composition is then sprayed on the substrate using a conventional low pressure spray gun at a wet film thickness of from about 3 to 10 microns.

Thereafter, the solvents are allowed to evaporate either at room temperature for about 10 minutes or at 100° F. to 120° F. for about 2 minutes. Coatings so applied level out well on the substrate, that is form a smooth contiguous film. The dry coating is essentially non-tacky and dust-free. Finally, the dry coating is exposed to actinic radiation to provide a cured coating of from about 1 to about 3 microns in dry film thickness.

Actinic radiation as used herein is electromagnetic radiation having a wavelength of 700 nanometers or less. The most commonly used form of actinic light and the preferred form herein is ultraviolet light, that is, electromagnetic radiation having a wavelength in the range of from about 180 nanometers to about 460 nanometers, although actinic light of greater or shorter wavelengths may also be used. Generally, exposures of from about 1 to 5 sec. are sufficient to effect curing of the compositions of this invention.

Any suitable source which emits ultraviolet light may be used in curing the compositions of this invention. Particularly preferred are ultraviolet emitting lamps of the medium mercury vapor type having a power rating of 200 watts/inch.

In order to more completely describe the present invention, the following Examples are given.

EXAMPLE 1

This example illustrates the preparation, application to a substrate and curing of a coating composition of this invention containing dipentaerythritol pentaacrylate and cellulose acetate butyrate. The cellulose acetate butyrate employed in this Example had on the average 37% butyryl groups, 13% acetyl groups and 2% hydroxyl groups and a viscosity in Poises of between about 64 and 124 at 25° C. in a solution comprising 20 wt. % cellulose acetate butyrate, 72 wt. % acetone and 8 wt. % ethyl alcohol.

A stock solution containing 14.3 wt. % of cellulose acetate butyrate in propyl acetate and propanol was first prepared by dissolving 50 parts by weight (p.b.w) of the cellulose acetate butyrate in a solvent mixture of 200 p.b.w. of propyl acetate and 100 p.b.w. of propanol.

A sprayable coating composition was prepared by dissolving a portion of the stock solution and dipentaerythritol pentaacrylate in a further solvent system containing methyl cellosolve, methyl isoamyl ketone, butyl acetate and butyl alcohol.

| Component | Total wt. % |
|---|---|
| Dipentaerythritol Pentaacrylate | 27.2 |
| Cellulose Acetate Butyrate | 2.7 |
| Propyl Acetate | 10.5 |
| Propyl Alcohol | 5.0 |
| Methyl Cellosolve | 22.7 |
| Butanol | 12.2 |
| Butyl Acetate | 12.2 |
| Methyl Isoamyl Ketone | 7.5 |
| | 100.0 |

This sprayable composition was then sprayed under low pressure on a polyvinyl chloride substrate (TENNECO CHEM. CO.) at a wet film thickness of about 4 microns using a DeVilbiss-TYPE EGA spray gun and allowed to dry in air at room temperature. The composition leveled out well on the substrate. Upon drying the film thickness was about 1 micron and was dust-free. The polyvinylchloride substrate coated with the curable mixture was then irradiated with high intensity UV light for about 3 sec. to effect curing. The sprayable composition could be left on the substrate for hours before UV curing without air inhibition of cure. A sample of the cured composition of Example 1 on the polyvinyl chloride substrate was subjected to abrasion by rubbing with a 1 inch block of aluminum covered with ⅛ inch thick 0000 steel wool under a 1000 gm. load. After each double rub (1 back and forth stroke) the coating was observed for visible scratches. The coating endured up to about 500 double rubs before visible scratching was noticed.

EXAMPLE 2

In this Example the sprayable composition of Example 1 containing 30% solids was applied to a vinyl substrate using hand gravuring with a number 180 roll. After removal of solvents the coating thickness was about 2 microns. Abrasion resistance as determined by the steel wool abrasion test of Example 1 was substantially the same as in Example 1.

EXAMPLE 3

This example illustrates the preparation, application to a substrate and curing of a composition containing dipentaerythritol pentaacrylate and a partially hydrolyzed vinyl chloride vinyl acetate copolymer. The partially hydrolyzed vinyl chloride vinyl acetate copolymer employed in this Example contained about 91% combined vinyl chloride, 3% combined vinyl acetate and 6% combined vinyl alcohol.

A stock solution containing 15 wt. % of copolymer was first prepared by dissolving 15 parts by weight (p.b.w.) of the copolymer in a solvent mixture of 60 p.b.w. butyl acetate and 25 p.b.w. butanol.

A sprayable coating composition was prepared by dissolving a portion of the so-formed stock solution and dipentaerythritol pentaacrylate in a further solvent system as shown below.

| Additive | p.b.w. |
|---|---|
| Stock Solution | 50 |
| Dipentaerythritol Pentaacrylate | 60 |
| Solvents | |
| Propyl acetate | 90 |
| Propanol | 50 |
| Methyl Cellosolve | 90 |

-continued

| Additive | p.b.w. |
| --- | --- |
| Methyl Isoamyl Ketone | 50 |
| | 390 |

This coating composition contained the following total weight percentages of each component.

| Component | | Total wt. % |
| --- | --- | --- |
| Dipentaerythritol Pentaacrylate | | 15.4 |
| Partially Hydrolyzed Vinyl Copolymer | | 1.9 |
| Propyl Acetate | | 23.1 |
| Butyl Acetate | | 7.7 |
| Propyl Alcohol | | 12.8 |
| Butanol | | 3.2 |
| Methyl Cellosolve | | 23.1 |
| Methyl Isoamyl Ketone | | 12.8 |
| | Total | 100 |

This curable composition was then sprayed under low pressure on a polyvinyl chloride substrate (TENNECO CHEM. CO.) at a wet film thickness of about 7 microns and allowed to dry in air at room temperature. The composition leveled out well on the substrate. Upon drying the film thickness was about 1.5 microns and was dust-free. The polyvinylchloride substrate coated with the curable mixture was then irradiated with high intensity UV light for about 2 sec. to effect curing. The composition could be left on the substrate for hours before UV coating without air inhibition of cure.

The polyvinyl chloride substrate coated with the cured composition was subjected to steel wool abrasion as in Example 1.

It was found that the coating was resistant to steel wool abrasion up to about 500 double rubs.

I claim:

1. A composition curable by actinic radiation to form an abrasion resistant product comprising a dipentaerythritol-based polyacrylate, a cellulose ester comprising the reaction product of cellulose with at least one organic carboxylic acid having from about 2 to about 4 carbon atoms or a vinyl chloride-vinyl acetate containing polymer, wherein said composition contains no photoinitiator.

2. The composition of claim 1 wherein said dipentaerythritol-based polyacrylate is selected from the group consisting of dipentaerythritol pentaacrylate, dipentaerythritol hexaacrylate, and mixtures thereof.

3. The composition of claim 1 wherein said dipentaerythritol-based polyacrylate is dipentaerythritol pentaacrylate.

4. The composition of claim 1 wherein said cellulose ester is cellulose acetate butyrate.

5. The composition of claim 4 wherein said cellulose acetate butyrate contains on the average from about 15% to 50% butyryl groups, from about 1% to 30% acetyl groups and from about 1% to 5% hydroxyl groups.

6. The composition of claim 4 wherein said cellulose acetate butyrate has a viscosity in Poises of from about 50 to 200 at 25° C. in a solution comprising 20 wt. % cellulose acetate butyrate, 72 wt. % acetone and 8 wt. % ethyl alcohol.

7. The composition of claim 1 wherein said vinyl chloride-vinyl acetate containing copolymer is a partially hydrolyzed vinyl chloride-vinyl acetate copolymer containing from about 50% to 95% combined vinyl chloride monomer, from about 2% to about 35% combined vinyl acetate monomer and from about 3% to about 15% combined vinyl alcohol monomer.

8. The composition of claim 1 which further comprises at least one solvent selected from the group consisting of lower alcohols, lower alkyl acetates, alkyl ketones having from 3 to 7 carbon atoms and ethylene glycol lower alkyl ethers.

9. A composition curable by actinic radiation to form an abrasion resistant product comprising dipentaerythritol pentaacrylate, a cellulose acetate butyrate containing on the average from about 15% to 50% butyryl groups, from about 1% to 30% acetyl groups and from about 1% to 5% hydroxyl groups or a partially hydrolyzed vinyl chloride-vinyl acetate copolymer containing from about 50% to 95% combined vinyl chloride monomer from about 2% to about 35% combined vinyl acetate monomer and from about 3% to about 15% combined vinyl alcohol monomer, wherein the weight ratio of said pentaerythritol to said butyrate or copolymer is from about 6 to 1 to about 100 to 1, and wherein said composition contains no photoinitiator.

10. The composition of claim 9 wherein said cellulose acetate butyrate has a viscosity in Poises of from about 50 to 200 at 25° C. in a solution comprising 20 wt. % cellulose acetate butyrate, 72 wt. % acetone and 8 wt. % ethyl alcohol.

11. The composition of claim 9 wherein said cellulose acetate butyrate contains on the average 37% butyryl groups, 13% acetyl groups and 2% hydroxyl groups and has a viscosity in Poises of from about 64 to 124 at 25° C. in a solution comprising 20 wt. % cellulose ester, 72 wt. % acetone and 8 wt. % ethyl alcohol.

12. The composition of claim 9 which further comprises at least one solvent selected from the group consisting of lower alcohols, lower alkyl acetates, alkyl ketones having from 3 to 7 carbon atoms and ethylene glycol lower alkyl ethers.

13. The composition of claim 9 wherein the weight ratio of pentaacrylate to butyrate is from about 8 to 1 to about 20 to 14. The composition of claim 13 wherein said weight ratio is about 10:1.

15. The composition of claim 9 wherein the weight ratio of pentaacrylate to copolymer is from about 6 to 1 to 15 to 1.

16. The composition of claim 15 wherein said weight ratio is about 8 to 11.

17. The composition of claim 9 wherein said copolymer contains 90% combined vinyl chloride, 3% combined vinyl acetate and 6% combined vinyl alcohol.

18. A product comprising the cured composition of claim 1.

19. A product comprising the cured composition of claim 9.

20. An abrasion-resistant product comprising a substrate having coated thereon the cured composition of claim 1.

21. The product of claim 20 wherein said substrate is a polymeric material selected from the group consisting of a polyacrylics, polyvinyls, polycarbonates and polyesters.

22. An abrasion resistant product comprising a substrate having coated thereon the cured composition of claim 9.

23. The product of claim 22 wherein said substrate is a polymeric material selected from the group consisting of polyvinyls, polyacrylics, polycarbonates and polyesters.

24. A method of providing an abrasion resistant coating on a substrate comprising:
   (a) forming a composition curable by actinic radiation comprising a dipentaerythritol-based polyacrylate, a cellulose ester comprising the reaction product of cellulose with at least one organic carboxylic acid having from about 2 to about 4 carbon atoms or a vinyl chloride-vinyl acetate containing copolymer wherein said composition contains no photoinitiator;
   (b) applying said composition to said substrate; and
   (c) irradiating said composition with actinic radiation to effect curing thereof.

25. The method of claim 24 wherein said dipentaerythritol-based polyacrylate is pentaerythritol pentaacrylate.

26. The method of claim 24 wherein said cellulose acetate butyrate contains on the average from about 15% to 50% butyryl groups, from about 1% to 30% acetyl groups and from about 1% to 5% hydroxyl groups.

27. The method of claim 26 wherein said cellulose acetate butyrate has a viscosity in Poises of from about 50 to 200 at 25° C. in a solution comprising 20 wt. % cellulose ester, 72 wt. % acetone and 8 wt. % ethyl alcohol.

28. The method of claim 26 wherein said cellulose acetate butyrate contains on the average 37% butyryl groups 13% acetyl groups and about 2% hydroxyl groups.

29. The method of claim 24 wherein said copolymer is a partially hydrolyzed vinyl chloride-vinyl acetate copolymer containing from about 50 to 95% combined vinyl chloride, from about 2% to 35% combined vinyl acetate and from about 3% to about 15% combined vinyl alcohol monomer.

30. The method of claim 25 wherein said copolymer contains 91% combined vinyl chloride, 3% combined vinyl acetate and 6% combined vinyl alcohol.

31. The method of claim 24 wherein said composition is applied by spraying.

32. The method of claim 24 wherein said composition is applied by roller gravure coating.

33. The method of claim 24 wherein said substrate is a polymeric material selected from the group consisting of polyacrylics, polyvinyls, polycarbonates and polyesters.

* * * * *